US012132879B1

(12) United States Patent
Chang et al.

(10) Patent No.: US 12,132,879 B1
(45) Date of Patent: Oct. 29, 2024

(54) COMPLEX COLOR SPACE CONVERSION USING CONVOLUTIONAL NEURAL NETWORKS

(71) Applicant: KYOCERA Document Solutions, Inc., Osaka (JP)

(72) Inventors: Michael M. Chang, Redondo Beach, CA (US); Dongpei Su, Palos Verdes Estates, CA (US); Sheng Li, Irvine, CA (US); Kenneth Allen Schmidt, Redondo Beach, CA (US)

(73) Assignee: KYOCERA Document Solutions, Inc., Osaka (JP)

(*) Notice: Subject to any disclaimer, the term of this patent is extended or adjusted under 35 U.S.C. 154(b) by 0 days.

(21) Appl. No.: 18/468,961

(22) Filed: Sep. 18, 2023

(51) Int. Cl.
*H04N 1/60* (2006.01)
*G06N 3/04* (2023.01)
*G06N 3/08* (2023.01)

(52) U.S. Cl.
CPC .............. *H04N 1/6016* (2013.01); *G06N 3/04* (2013.01); *G06N 3/08* (2013.01)

(58) Field of Classification Search
CPC .................................................. H04N 1/6016
See application file for complete search history.

(56) References Cited

U.S. PATENT DOCUMENTS

| | | | | |
|---|---|---|---|---|
| 11,023,791 B2* | 6/2021 | Chang | ...................... | G06N 3/04 |
| 11,909,933 B1* | 2/2024 | Su | ...................... | H04N 1/00859 |
| 2019/0273948 A1* | 9/2019 | Yin | ...................... | G06N 3/045 |
| 2020/0394516 A1* | 12/2020 | Chen | ...................... | G06F 18/2413 |
| 2021/0133522 A1* | 5/2021 | Chang | ................... | G06F 16/2282 |
| 2023/0196572 A1* | 6/2023 | Nair | ............................. | G06T 7/11 |
| | | | | 351/200 |
| 2023/0214340 A1* | 7/2023 | Luo | ...................... | G06F 13/1668 |
| | | | | 710/22 |
| 2023/0329646 A1* | 10/2023 | Zhou | ...................... | G16H 50/30 |
| 2024/0078189 A1* | 3/2024 | Clark | ................... | G06F 12/0868 |

* cited by examiner

*Primary Examiner* — Benjamin O Dulaney
(74) *Attorney, Agent, or Firm* — Rowan TELS LLC

(57) ABSTRACT

A device such as a color printer includes a main memory, a cache memory, and a convolutional neural network configured to convert pixels from a first color space to a second color space. The convolutional neural network is organized into execution-separable layers, and loaded one or more layer at a time (depending on cache size) from the main memory to the cache memory, whereby the pixels are processed through each of the layers in the cache memory, and layers that have completed processing are evicted to make room for caching next layer(s) of the network.

14 Claims, 8 Drawing Sheets

COMPLEX COLOR SPACE CONVERSION USING CONVOLUTIONAL NEURAL NETWORKS

BACKGROUND

The process of generating and printing digital media such as images is often carried out using multiple distinct devices. For example, the "source device" for generating and/or viewing a document with embedded images may be a computer monitor configured to utilize a red-green-blue (RGB) color space, and the "destination device" for printing the document may be a color printer, which utilizes a CMYK color space.

CMYK is shorthand for the four inks used in color printing: cyan, magenta, yellow, and key (black). The CMYK color space is a subtractive color model, which means that blending together all three primary colors (cyan, magenta, and yellow) subtracts light from white, resulting in a darker color. The key (black) color is added to the mix to ensure that the shadows and dark areas in an image are reproduced accurately. The CMYK color space is widely used in the printing industry to produce color images and text in printed documents.

To accurately reproduce the color from the source device on the destination device, a color conversion process is implemented. Certain color conversions (i.e., RGB→L*a*b) are governed by well defined mathematical equations, while other color conversions (i.e., L*a*b→CMYK) do not have a well defined mathematical equations. For the color conversions that are without well defined mathematical equations, look-up tables (LUTs) are used to capture local empirical correspondences.

The L*a*b* color space is a three-dimensional color model used to describe perceivable colors in a uniform way. It defines colors based on three axes: lightness (L*), green-red (a*) and blue-yellow (b*). The L* axis ranges from 0 (black) to 100 (white), while the a* and b* axes range from −128 to 127, with values in the negative range indicating green or blue tones, and values in the positive range indicating red or yellow tones.

By way of example, to convert from the L*a*b* color space to the CMYK color space, a three-dimensional (3D) lookup table (LUT) may be utilized. A complete 3D-LUT for the color conversion comprises 256×256×256 entries each storing a 4-byte CMYK output value, requiring a total of 67 megabytes of memory space to store the LUT. To reduce the size of the LUT, a sparse grid and interpolation may be used. For example, the reduced 3D-LUT may be implemented by a 17×17×17 sparse grid, or 19 kilobytes.

CIELAB, also known as CIE L*a*b*, is a color space developed by the International Commission on Illumination (CIE). It is designed to objectively represent human perception of color, taking into account all perceivable colors in a three-dimensional model. The CIELAB color space consists of three components:

L*: Represents the lightness or darkness of the color. L*=0 corresponds to black, while L*=100 represents white.

a*: Describes the range from green (−) to red (+). Negative values represent green shades, and positive values represent red shades.

b*: Represents the range from blue (−) to yellow (+). Negative values indicate blue shades, and positive values indicate yellow shades.

The CIELAB color space is device-independent, meaning it is not specific to any particular device or media. This enables accurate color communication and color management across different devices and platforms. CIELAB is used in industries such as design, printing, and color science for precise color measurement, analysis, and reproduction.

CIEXYZ, also known as CIE 1931 XYZ color space, is another standardized color space developed by the International Commission on Illumination (CIE). It serves as a mathematical model designed to objectively define and represent all perceivable colors. The CIEXYZ color space is based on the principle of trichromacy, which states that any visible color can be created by mixing different amounts of three primary colors—X, Y, and Z. The X, Y, and Z values in CIEXYZ represent the amount of stimulation received by the three types of color receptors in the human visual system known as cones. X, Y, and Z correspond to the stimulation from red, green, and blue light respectively. The CIEXYZ color space serves as a foundation for many other color spaces and is utilized in color science, color management, and color-related industries. It provides a device-independent and perceptually uniform framework for accurate color representation, measurement, manipulation, and comparison across different devices, media, and lighting conditions.

A conversion from an RGB color space to a CIE L*a*b* color space is a 3D→3D conversion that may be implemented with a 3D LUT. A conversion from a CMYK color space to a CIE L*a*b* color space is a 4D→3D conversion that may be implemented with a 4D LUT. A conversion from a CIE L*a*b* color space to a CMYK color space is a 3D→4D conversion that may be implemented with a 3D LUT. Multiple color space conversions of these types, carried out in sequence, involves a 3D→4D conversion or a 4D→4D conversion, and would thus utilize either a 3D LUT or a 4D LUT.

Output Intent refers to an element of files organized in the Portable Document Format (PDF) that defines the intended color characteristics and reproduction conditions for the final output of the PDF document. The Output Intent has particular utility in implementations where accurate color reproduction is crucial, such as in printing and color-critical applications. The Output Intent specifies the color space, color profile, and other color-related settings that are recommended for rendering the PDF document on various output devices, such as printers or monitors. It enables consistent and predictable color reproduction regardless of the device or platform used to view or print the PDF. Typically, an Output Intent is defined using ICC profiles that accurately define the color characteristics of the intended output device. When a PDF is created, an Output Intent is be embedded within the document to guide the rendering process. This facilitates the display or printing of the document with the intended colors, helping to maintain color integrity and consistency across different devices.

An ICC profile is a standardized file format that defines the color properties of devices such as printers, scanners, cameras, and monitors. The profile comprises values for the color space, gamut, and calibration settings of a device, enabling accurate color reproduction across different devices and platforms. ICC profiles enable consistent and predictable color representation across different devices, and enable color management and color matching in various applications such as graphic design, printing, and digital imaging. ICC profiles facilitate the maintenance of color integrity and accurate color reproduction from one device to another.

ICC profiles provide a mapping between the device source or target color space and a profile connection space (PCS). This PCS is either CIELAB or CIEXYZ. Mappings may be specified using tables, to which interpolation is applied, or through a series of conversion parameters.

Utilizing a reduced sparse grid reduces the LUT size at the cost of accuracy of color conversion. Some color conversions may require larger LUTs to provide the necessary conversion accuracy, for example a 33×33×33 grid. Storing these larger LUTs may strain high-performance memory (e.g., cache) resources especially in embedded applications such as printers, and may lead to cache thrashing.

Cache thrashing typically occurs in situations where the working set of data being accessed by the processor is larger than the available cache capacity. This may happen due to poor memory locality or inefficient memory access patterns in the code. The consequences of cache thrashing include increased instruction execution time, higher memory latency, and overall system slowdown.

Cache thrashing may be a particularly serious problem in embedded system where the (randomly) accessed data size greatly exceeds the data cache size, where low data locality is present and memory accesses frequently result in a cache miss.

Conventional LUT implementations provide poor data locality due to the typically unpredictable distribution of pixel colors in images or other sources. The lack of data locality may lead to cache thrashing whereby a majority of LUT accesses to be directly and repetitively made from slower memory structures (e.g., dynamic random access memory, DRAM).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
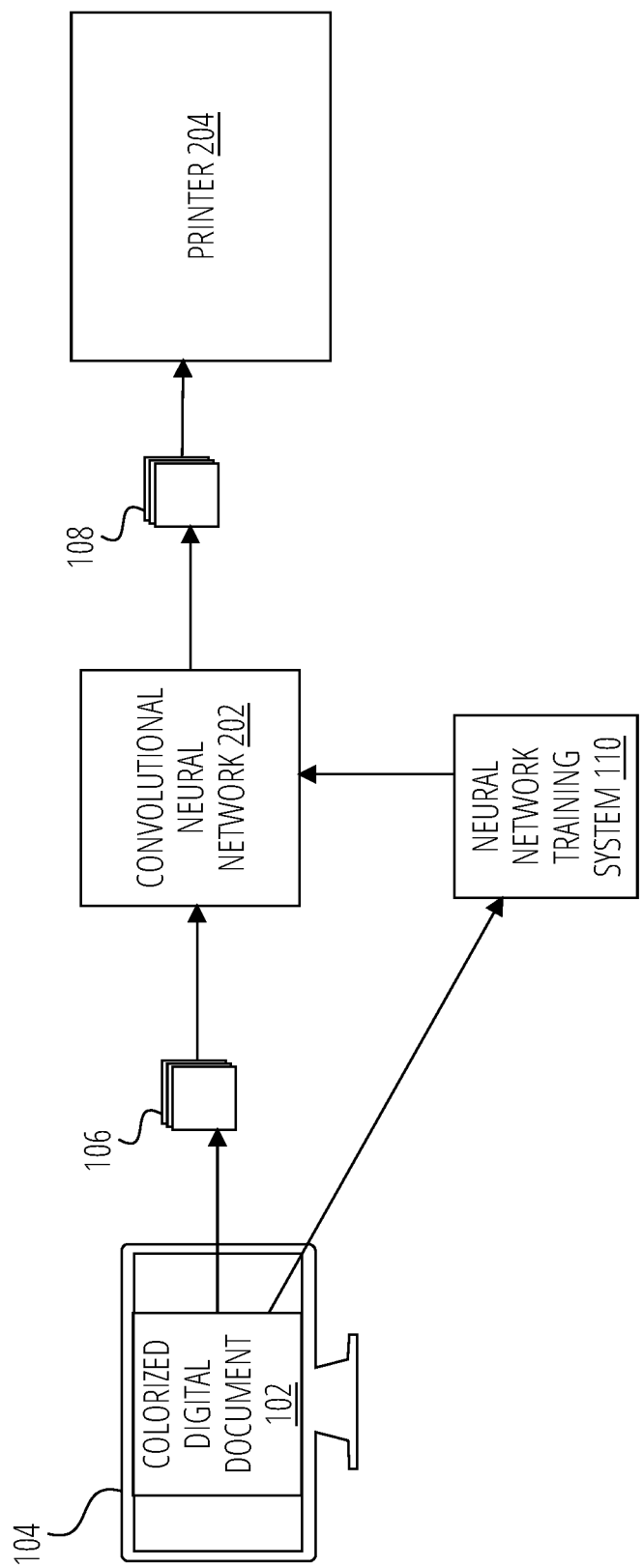
FIG. 1 depicts a pixel rendering system in accordance with one embodiment.

Mechanisms are disclosed for accurate color conversion in embedded device environments where high-performance (e.g., L1 cache) memory resources are constrained. The mechanisms utilize convolutional neural networks implementing International Color Consortium (ICC) profiles and exhibit performance comparable to conventional LUT mechanisms with lower memory resource consumption.

Cache memory thrashing occurs in devices when a data processor spends a significant amount of time swapping data between the cache and main memory, resulting in poor performance and accelerated cache memory wear. This phenomenon occurs when the cache is repeatedly filled and emptied with different data due to a high rate of cache misses. Cache thrashing may occur when the processor frequently accesses data that is not present in the cache, causing cache lines to be evicted and replaced with new data. As a result, the cache becomes ineffective in improving overall performance and instead becomes a bottleneck.

In one embodiment one or more convolutional neural networks embodying the conversion of a pair of ICC profiles are utilized in sequence to convert images from RGB or other color spaces for display devices (e.g., for an image embedded in a digital PDF file) to a CMYK color space for a printer device. The two ICC profiles are referred to as a source color space profile and a destination color space profile, respectively.

In one embodiment the image colors are converted via one or more convolutional neural networks implementing the source color space profile conversion to a CIELAB color space and then from CIELAB to the printer CMYK color space via one or more convolutional neural networks implementing the destination color space profile conversion.

In another embodiment an object's color space is first converted via one or more convolutional neural networks to an Output Intent format, e.g., to Output Intent defined for a PDF document. The output intent (e.g., for PDF documents) is often a CMYK color space. One or more additional convolutional neural networks implement the destination color space profile conversion to convert from the Output Intent color space to the destination color space. For example, in one embodiment a pair of convolutional neural networks converts pixels in a source color space (e.g., for an image in a PDF document) to L*a*b* and from L*a*b* to an Output Intent format, and another pair of convolutional neural networks converts from the Output Intent format back to-L*a*b* and from L*a*b* to the destination color space (e.g., for a CMYK printer).

In one embodiment the conversion may be achieved from source to destination device color spaces based on a convolutional neural network implementing a single ICC-based conversion, e.g., without an intermediate conversion to a format such as CIE L*a*b*. For example a single such convolutional neural network may be utilized to convert from the sRGB color space (International Electrotechnical Commission (IEC) as IEC 61966-2-1:1999) to a printer CMYK color space.

To implement these color space conversions in memory-constrained applications, the disclosed mechanisms utilize pretrained convolutional neural networks, e.g., convolutional neural networks (CNNs). In one embodiment the CNN consists of six sequential layers, making it efficient in both performance and memory footprint. For example CNNs of this form may perform a wide range of color space conversions with less than 3% maximum error from ground truth. To achieve even greater accuracy, the size of the CNN may be increased, if the particular application permits for greater memory utilization.

In various embodiments, a pre-trained CNN may be utilized for 3D→3D, 3D→4D, 4D→4D, and 4D→3D color conversions, with accuracy and performance on par with utilizing LUT sizes of $17^3$, $11^4$, $33^3$, $17^4$, and $37^3$. In one embodiment the CNN may comprise six layers configured as follows: 3→32→64→128→128→64→4, where the numbers indicate depth of the feature maps at each stage of the network. A CNN in accordance with this embodiment may utilize approximately 18 KB of memory resources, which fits well into the cache constraints of many/most embedded applications. In another embodiment the CNN may comprise six layers configured as follows:

3→64→128→256→128→64→4. A CNN in accordance with this embodiment may utilize approximately 74 KB of memory resources, which also fits well into the cache constraints of many embedded applications.

Unlike conventional implementations utilizing LUTs, the disclosed CNN mechanisms separate the color conversion into localized processing stages according to the convolutional neural network layering. For each layer operation, the CNN utilizes a fraction of the total weight and activation parameters of the overall neural network. This enables each layer operation to be carried out from on-chip SRAM in embedded applications with improved performance over LUT mechanisms.

The disclosed mechanisms thus enable the layer-separated, localized sequencing of color space conversion in which each pixel is processed in a common manner, one layer at a time. The parameters for each layer may be loaded on-chip using efficient burst mechanisms.

The disclosed mechanisms may also scale in accuracy more efficiently than LUT mechanisms. For example, to scale accuracy from what is obtained using a 173 sized LUT to that which is obtained using a $33^3$ sized LUT involves an increase in LUT size, and thus memory resources, of roughly a factor of eight. To achieve the same increase in accuracy, the network size may be increased by a factor of about 2.4.

In some cases, a source color space profile or output intent color space profile may be encountered "on-the-fly", e.g., when a PDF or other document is communicated to a printer. In these situations, the profile may be identified during the document preflight process, and a CNN may be dynamically configured (trained) to embody the conversion in the profile.

The PDF preflight process refers to the examination and verification of a PDF file's compliance with specific standards or requirements. It ensures that the PDF is structurally sound and ready for distribution or printing. This process involves validating various elements of the PDF, such as fonts, colors, images, transparency, metadata, and overall file structure. During preflight, the PDF file is checked against a set of predefined rules or profiles, often based on industry standards like the PDF/X or PDF/A standards. These rules help ensure that the PDF can be reliably reproduced across different devices and platforms.

The dynamically trained CNN is then loaded in the printer cache before raster image processing (RIP) and print of the document. RIP refers to the conversion of vector-based PDF data into raster images for printing. Rasterization involves breaking down the vector-based layout into a grid of pixels. Other actions performed during RIP may include halftoning, color conversions to the printer's color space, and screening.

Example embodiments are described and depicted below for a device (such as a color printer) that includes a main memory, a cache memory, and a convolutional neural network configured to convert pixels of a digital document from a first color space to a second color space. The convolutional neural network is organized into execution-separable layers, and loaded one or more layer at a time (depending on cache size) from the main memory to the cache memory, whereby the pixels are processed through each of the layers in the cache memory, and layers that have completed processing are evicted to make room for caching next layer(s) of the network. Other technical features not depicted or described in the interest of being concise may be readily apparent to one skilled in the art from the following figures, descriptions, and claims.

In another aspect, embodiments are described that include a device with a main memory, a cache memory, logic to detect a profile for a first color space embedded in a digital document (e.g, PDF file parsers known in the art), and logic (e.g., network communication hardware and software known in the art) to submit the profile to a neural network training system. The submission to the neural network training system is made in response to receiving a print job includes the digital document. The receiving system (e.g., a premise server or cloud computing system) includes logic to apply the profile as a training set to configure a convolutional neural network to convert pixels of the digital document from the first color space to a second color space utilized by the device, the convolutional neural network organized into execution-separable layers. The device further includes logic to load a first layer of the convolutional neural network from the main memory to the cache memory, process pixels of the digital document through the first layer, evict the first layer from the cache memory, load a second layer of the convolutional neural network from the main memory to the cache memory, and process the pixels through the second layer, and so on for consecutive layers of the convolutional neural network.

FIG. 1 depicts a pixel rendering system in accordance with one embodiment. A colorized digital document 102 is displayed on a machine display device 104 configured with a first color space. The source pixels 106 from the colorized digital document 102 are converted through a convolutional neural network 202 into destination pixels 108 in a second color space utilized by a printer 204. The convolutional neural network 202 may be configured using a neural network training system 110 to convert between an output intent color space profile of the colorized digital document 102 and the second color space of the printer 204. Generally, the machine display device 104 could be any device that processes pixels, such as a mobile phone camera, a color scanner, and so on. Generally, the printer 204 could be any device that processes pixels, such as a second machine display device, a mobile phone display, a computer game, a color fax machine, and so on.

Figure 2:
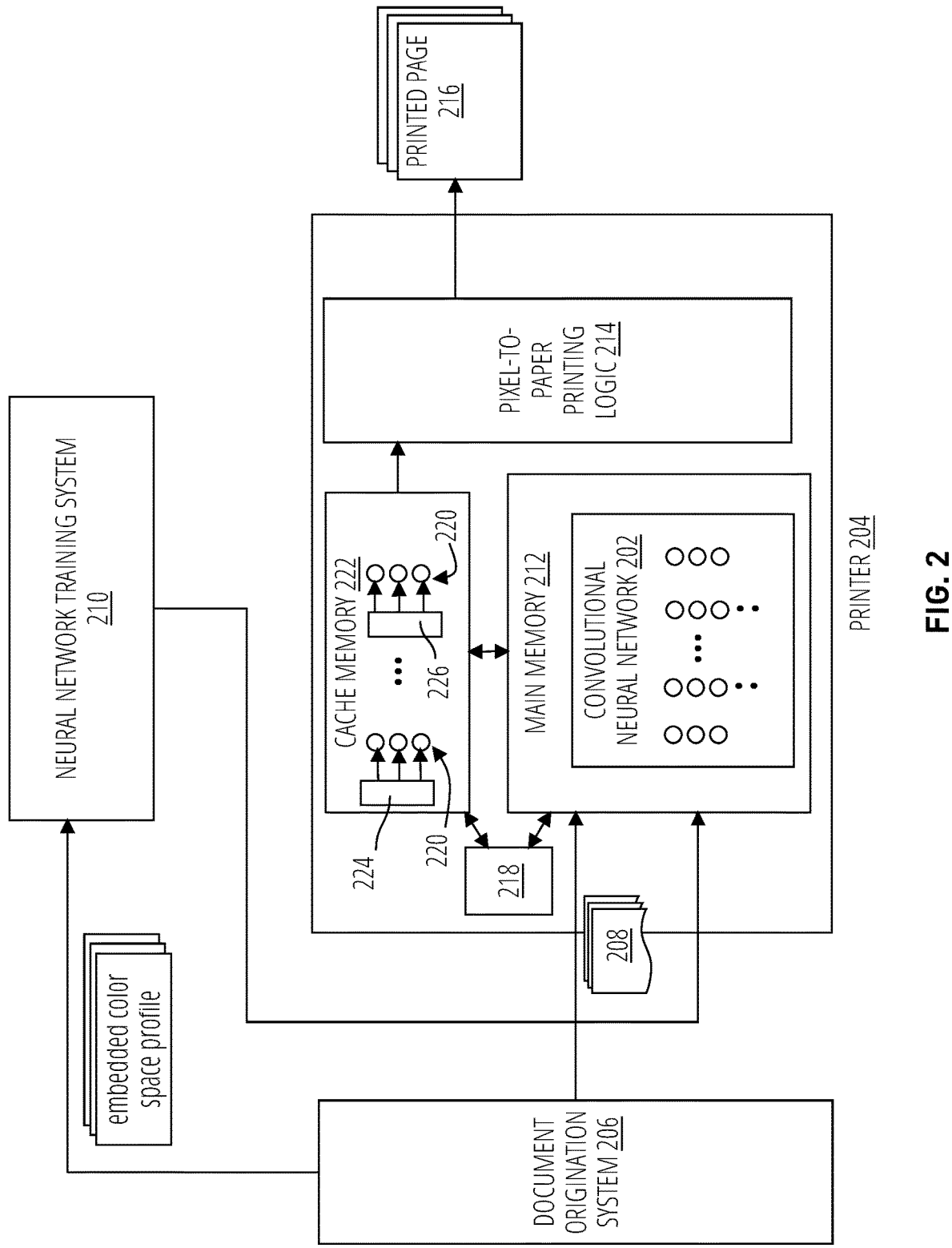
FIG. 2 depicts additional aspects of a pixel rendering system in accordance with one embodiment.

FIG. 2 depicts additional aspects of a pixel rendering system in accordance with one embodiment. The system comprises a document origination system 206 (e.g., any device with memory to store a color digital document), from which a color digital document 208 is provided to a pixel rendering device such as a printer 204, a machine display device, and so on. A convolutional neural network 202 configured by a neural network training system 210 is loaded into the main memory 212 of the pixel rendering device, e.g., the printer 204 in this example.

The neural network training system 210 may be a device or system of devices distinct from the printer 204 or other rendering device. For example the neural network training system 210 may be implemented by an on-premise server system (e.g., co-located in the same building or enterprise with the rendering device), or the neural network training system 210 may be implemented by a cloud system. In some cases, the neural network training system 210 may be implemented by the printer 204 or other rendering device itself.

The color digital document 208 may be configured in a color space different than a color space utilized by components of the rendering device. In this example, the color digital document 208 may be configured in a first color space different than a second color space that the pixel-to-paper printing logic 214 of the printer 204 is configured to process in order to render the color digital document 208 on a printed page 216.

The printer 204 in this example includes memory management logic 218 to load and evict individual layer instances 220 of the convolutional neural network 202 in sequence. A first layer instance 220 is loaded from the main memory 212 into the cache memory 222 (e.g., using burst memory transfer mechanisms known in the art) and plurality of pixels 224, 226 etc. of the color digital document 208 are processed through the first layer instance 220 to generate activation values (which may be retained in the cache memory 222). The first layer instance 220 is evicted from them cache memory 222 to make room for a second layer instance 220 to be loaded from the convolutional neural network 202 to the cache memory 222, and the process is repeated until output pixels are produced in the second color space of the printer 204.

The memory management logic 218 may operate at different layers of an operating system of the printer 204 or other device. For example, the memory management logic 218 may operate at a machine hardware level, in read-only memory, or at a device driver level, or at an application level, as suits the particular implementation.

Figure 3:
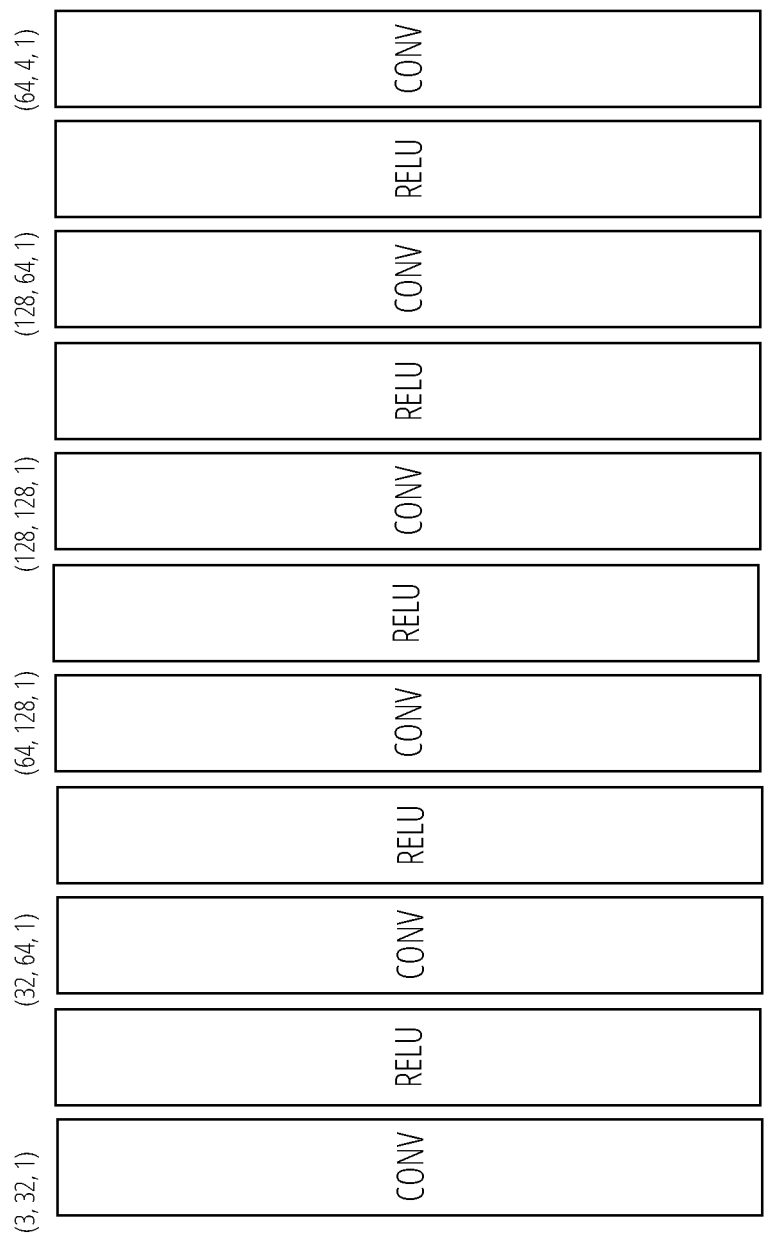
FIG. 3 depicts a color space convolutional neural network in accordance with another embodiment.

FIG. 3 depicts an exemplary structure of a 3D→4D color space converting convolutional neural network. The exemplary structure may be readily adapted to 3D→3D and 4D→3D conversions by appropriate sizing of the input and output layers. The convolutional layers are characterized by input depth, output depth, and kernel size.

The initial (3, 32, 1) input layer (input depth 3, output depth 32, kernel size 1) receives raw image pixel color values in a first color space and the final (64, 4, 1) output layer outputs pixel color values in a second color space. The intermediate convolution layers and non-linear rectifier activations (ReLU) along the processing path are also depicted.

Unlike many conventional convolutional neural networks, the convolutional neural network depicted in FIG. 3 utilizes many small (e.g., 1×1) filters in series instead of large filters in fewer layers.

The convolutional neural network depicted in FIG. 3 for example implement a color space conversion from RGB to CIE L*a*b* as follows:

MidConvNet((conv_relu_stack):
  Sequential(
    (0): Conv2d(3, 32, kernel_size=(1, 1), stride=(1, 1))
    (1): ReLU( )
    (2): Conv2d(32, 64, kernel_size=(1, 1), stride=(1, 1))
    (3): ReLU( )
    (4): Conv2d(64, 128, kernel_size=(1, 1), stride=(1, 1))
    (5): ReLU( )
    (6): Conv2d(128, 128, kernel_size=(1, 1), stride=(1, 1))
    (7): ReLU( )
    (8): Conv2d(128, 64, kernel_size=(1, 1), stride=(1, 1))
    (9): ReLU( )
    (10): Conv2d(64, 4, kernel_size=(1, 1), stride=(1, 1))
  )
)

The six-layer network embodiment depicted in FIG. 3 may be cached one layer at a time and multiple image pixels may be processed through the layer in parallel using multiple execution threads, e.g., utilizing a Graphics Processing Unit (GPU) or Embedded Vision Processor (EVP) and Single-Instruction Multiple-Data (SIMD) execution per pixel. Cache space permitting, multiple consecutive layers (e.g., 3→32 and 32→64) of the depicted network may be cached and processed simultaneously.

In one example deployment, an embedded ICC profile is encountered in a PDF or other digital file of a print job submitted for printing. The ICC profile is communicated over a network to a cloud service or print shop that operates a neural network training system that configures a convolutional neural network to perform color space conversion between the embedded ICC profile and the color space utilized by a printer on-site or at the print shop. The configured convolutional neural network is then downloaded to the main memory of the printer and the digital file is thereby printed.

Figure 4:
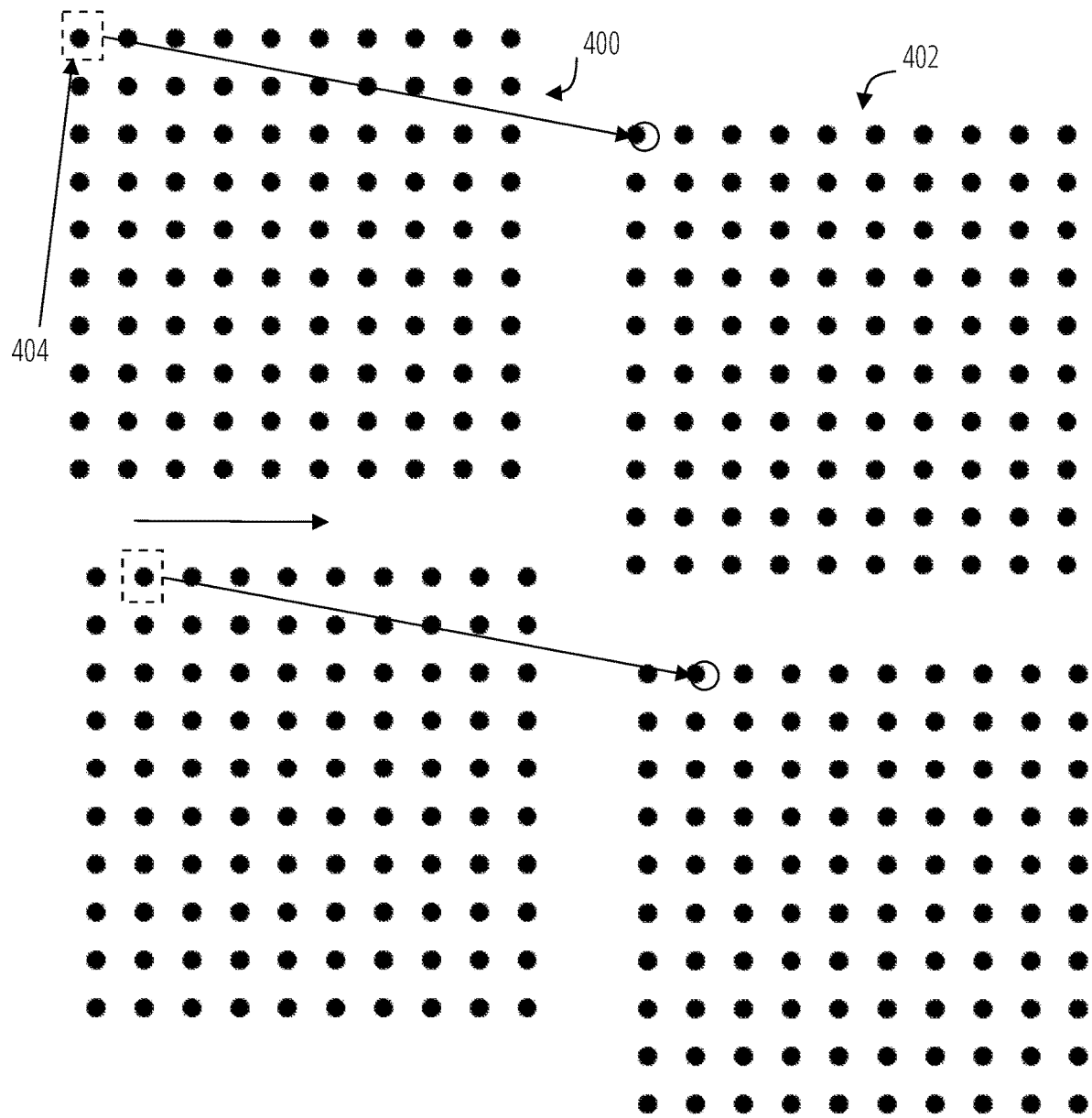
FIG. 4 depicts convolution layer filtering in accordance with one embodiment.

FIG. 4 depicts convolution layer filtering that couples outputs from groups of neurons in a convolution layer 400 to neurons in a next layer 402. A receptive field is defined for the convolution layer 400, in this example single neurons. The collective outputs of neurons in the receptive field are weighted and mapped to (typically one) neuron(s) in the next layer 402. This weighted mapping is referred to as the filter 404 for the convolution layer 400, or sometimes referred to as the kernel of the convolution layer 400.

The filter 404 depth is not depicted in this example. In other words, the filter 404 may actually comprise a cubic volume of neurons in the convolution layer 400, not a two-dimensional area as depicted. Thus what is depicted may comprise a "slice" of the full filter 404. The filter 404 is "slid", i.e. convolved, across the input pixel features, each time mapping to a different neuron(s) in the next layer 402. For example FIG. 4 depicts the filter 404 slid to the right by 1 unit (the "stride" length), creating a slightly offset receptive field from the top one, and mapping its output to the next neuron in the next layer 402.

Unique receptive fields in the convolution layer 400 for the steps map to different neurons in the next layer 402. The result of striding the kernel across a layer may be referred to as an activation map or feature map for the next layer. The number of total layers to use in a CNN, the number of convolution layers, the filter sizes, and the values for strides at each layer are referred to as "hyperparameters" of the CNN.

Figure 5C:
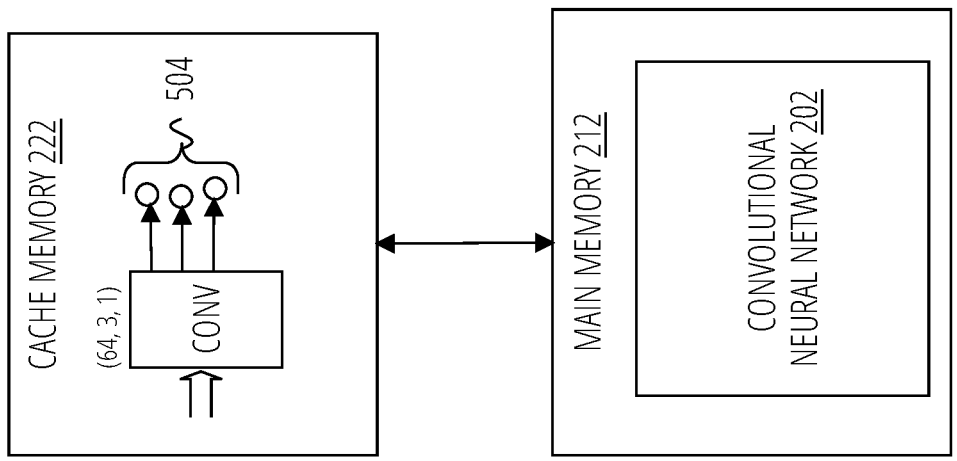
FIG. 5A-FIG. 5C depict an exemplary color space conversion process in a printer.
Figure 5B:
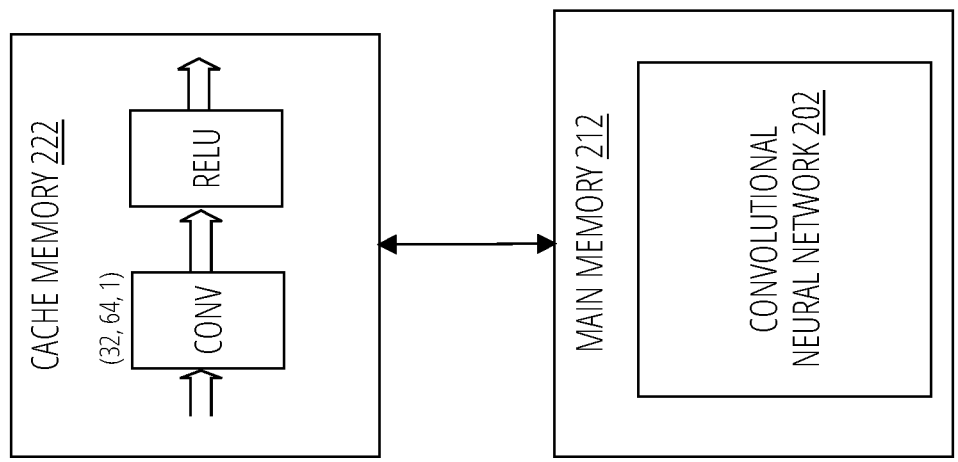
Figure 5A:
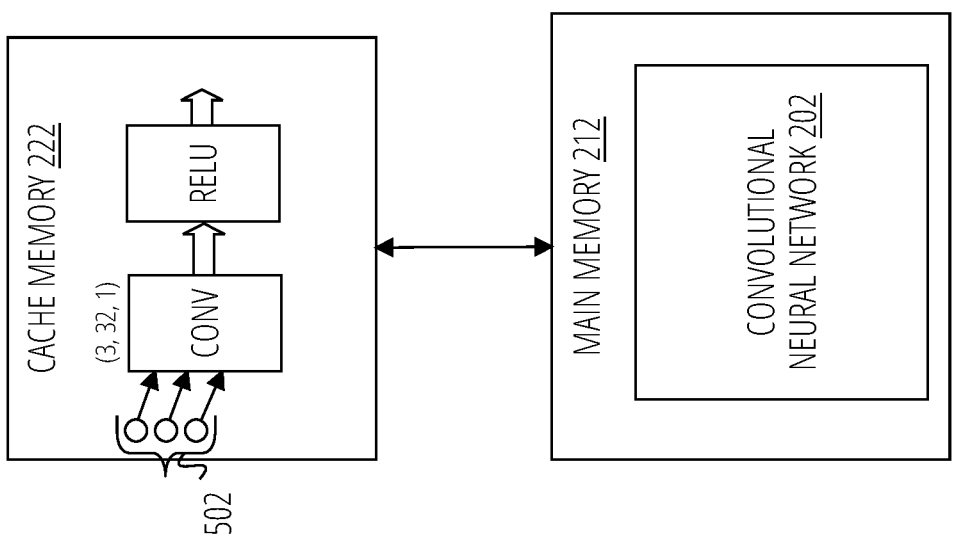

FIG. 5A-FIG. 5C depict an exemplary color space conversion process in a printer.

The process implements a layer-separated, localized sequencing of color space conversion in which multiple pixels are processed using parallel execution of one network layer of a time. The parameters (e.g., weights) of each layer may be bulk loaded from main memory to cache memory using efficient burst mechanisms known in the art. The receptive field (filter size) and stride of each convolution layer may be (1,1), respectively.

At FIG. 5A, a first conversion layer and activation algorithm of a convolutional neural network 202 are loaded from main memory 212 to cache memory 222. A plurality of input pixels 502 from a digital image in a first color space are processed through the cached layer, and activation values for each processed pixel are generated for a next layer of the convolutional neural network 202.

At FIG. 5B, a next conversion layer of the convolutional neural network 202 is loaded from the main memory 212 to the cache memory 222. (The previous cached layer may be partially or fully evicted from the cache memory 222). The activation values generated in FIG. 5A are processed through this next cached layer, and new activation values are generated for a next layer of the convolutional neural network 202. This process is repeated for additional hidden layers of the convolutional neural network 202.

At FIG. 5C, the output conversion layer of the convolutional neural network 202 is loaded from main memory 212 to cache memory 222. A plurality of output pixels 504 to print in a second color space are generated by the cached layer.

Figure 6:
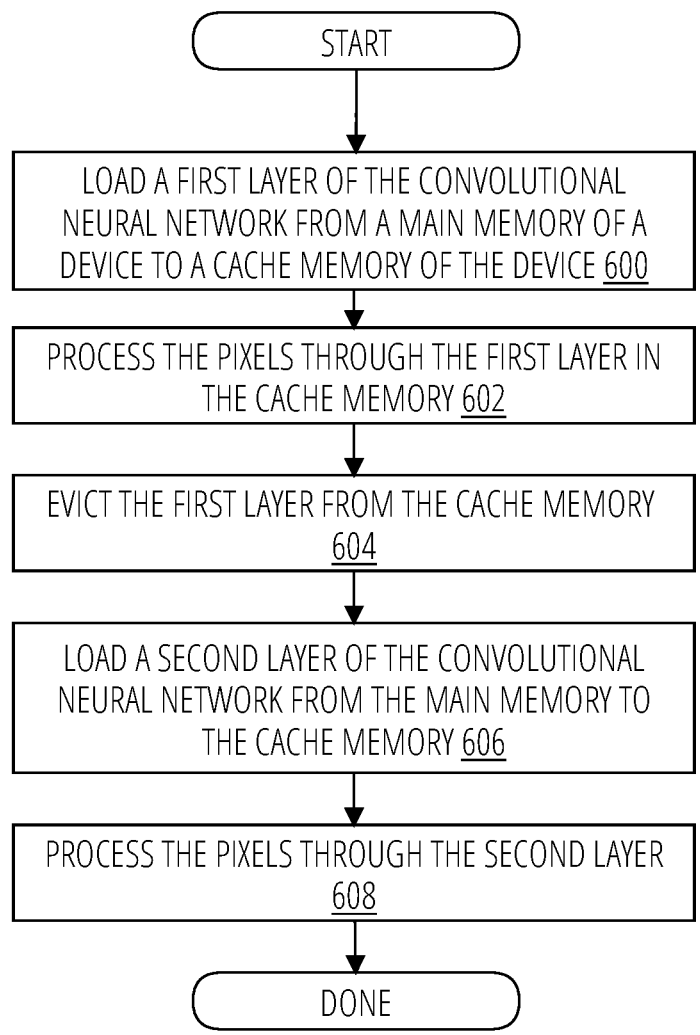
FIG. 6 depicts a color space conversion process in accordance with one embodiment.

FIG. 6 depicts a color space conversion process in one embodiment. In block 600, a first layer of the convolutional neural network is loaded from a main memory of a device to a cache memory of the device. In block 602, color pixels are processed through the first layer in the cache memory. In block 604, the first layer is evicted from the cache memory. In block 606, a second layer of the convolutional neural network is loaded from the main memory to the cache memory. In block 608, the pixels are processed through the second layer. This method may be repeated for additional consecutive layers of the convolutional neural network to complete the color space conversion of the pixels.

Figure 7:
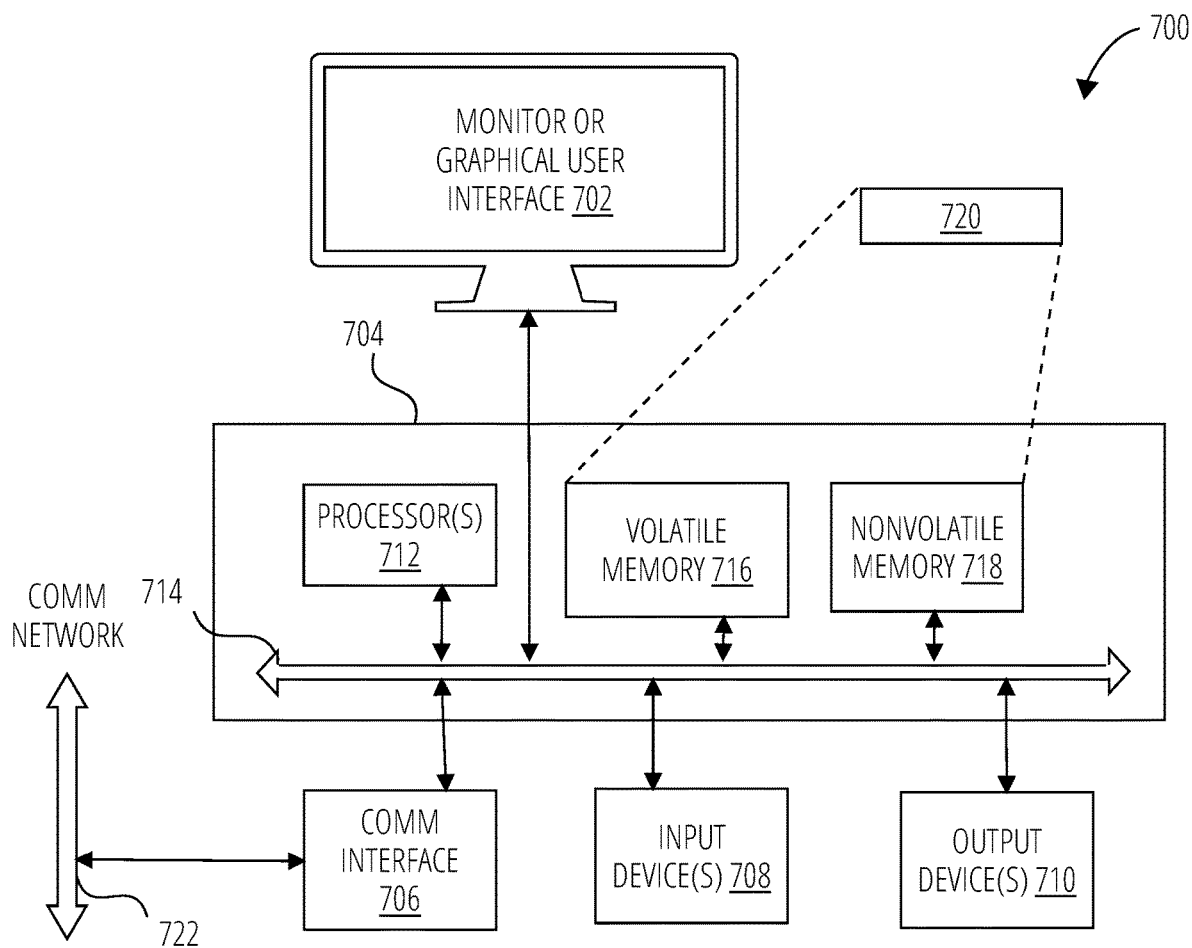
FIG. 7 depicts a pixel rendering device 700 that may implement aspects of the disclosed embodiments.

FIG. 7 is an example block diagram of a pixel rendering device 700 such as a printer that may incorporate aspects of the disclosed mechanisms. FIG. 7 is one illustrative example of a machine system to implement aspects of the technical processes described herein, and does not depict every component of such machines, though additional components will be apparent to those of skill in the art depending on the particular device. One of ordinary skill in the art will readily recognize other variations, modifications, and alternatives.

In one embodiment, the pixel rendering device 700 typically includes a monitor or graphical user interface 702, a data processing system 704, a communication network interface 706, input device(s) 708, output device(s) 710, and the like.

As depicted in FIG. 7, the data processing system 704 may include one or more processor(s) 712 that communicate with a number of peripheral devices via a bus subsystem 714. These peripheral devices may include input device(s) 708, output device(s) 710, communication network interface 706, and a storage subsystem, such as a volatile memory 716 and a nonvolatile memory 718.

The volatile memory 716 and/or the nonvolatile memory 718 may store computer-executable instructions and thus forming logic 720 that when applied to and executed by the processor(s) 712 implement embodiments of the processes disclosed herein.

The input device(s) 708 include devices and mechanisms for inputting control information to the data processing system 704. These may include a keyboard, a keypad, a touch screen incorporated into the monitor or graphical user interface 702, audio input devices such as voice recognition systems, microphones, and other types of input devices. In various embodiments, the input device(s) 708 may be embodied as a computer mouse, a trackball, a track pad, a joystick, wireless remote, drawing tablet, voice command system, eye tracking system, and the like. The input device(s) 708 typically allow a user to select objects, icons, control areas, text and the like that appear on the monitor or graphical user interface 702 via a command such as a click of a button or the like.

The output device(s) 710 include devices and mechanisms for outputting information from the data processing system 704. These may include the monitor or graphical user interface 702, speakers, printers, infrared LEDs, and so on as well understood in the art.

The communication network interface 706 provides an interface to communication networks (e.g., communication network 722) and devices external to the data processing system 704. The communication network interface 706 may serve as an interface for receiving data (such as color pixels) from and transmitting data to other systems. Embodiments of the communication network interface 706 may include an Ethernet interface, a modem (telephone, satellite, cable, ISDN), (asynchronous) digital subscriber line (DSL), Fire-Wire, USB, a wireless communication interface such as BlueTooth or WiFi, a near field communication wireless interface, a cellular interface, and the like.

The communication network interface 706 may be coupled to the communication network 722 via an antenna, a cable, or the like. In some embodiments, the communication network interface 706 may be physically integrated on a circuit board of the data processing system 704, or in some cases may be implemented in software or firmware, such as "soft modems", or the like.

The pixel rendering device 700 may include logic that enables communications over a network using protocols such as HTTP, TCP/IP, RTP/RTSP, IPX, UDP and the like.

The volatile memory 716 and the nonvolatile memory 718 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 716 and the nonvolatile memory 718 may be configured to store the basic programming and data constructs that provide the functionality of the disclosed processes and other embodiments thereof that fall within the scope of the present claims.

Logic 720 that implements embodiments of the disclosed mechanisms may be stored in the volatile memory 716 and/or the nonvolatile memory 718. Said logic 720 may be read from the volatile memory 716 and/or nonvolatile memory 718 and executed by the processor(s) 712. The volatile memory 716 and the nonvolatile memory 718 may also provide a repository for storing data used by the logic 720.

The volatile memory 716 and the nonvolatile memory 718 (collectively, machine-readable media) may include a number of memories including a main random access memory (RAM) and a cache memory for storage of instructions and data during program execution and a read only memory (ROM) in which read-only non-transitory instructions are stored. The volatile memory 716 and the nonvolatile memory 718 may include a file storage subsystem providing persistent (non-volatile) storage for program and data files. The volatile memory 716 and the nonvolatile memory 718 may include removable storage systems, such as removable flash memory.

The bus subsystem 714 provides a mechanism for enabling the various components and subsystems of data processing system 704 communicate with each other as intended. Although the communication network interface 706 is depicted schematically as a single bus, some embodiments of the bus subsystem 714 may utilize multiple distinct busses.

It will be readily apparent to one of ordinary skill in the art that the computing device may be a device such as a printer, multi-function device (e.g., integrated printer, scanner, and fax), smartphone, a desktop computer, a laptop computer, a rack-mounted computer system, a computer server, or a tablet computer device. As commonly known in the art, the pixel rendering device 700 may be implemented as a collection of multiple networked computing devices. Further, the pixel rendering device 700 will typically include operating system logic (not illustrated) the types and nature of which are well known in the art.

Aspects of the mechanisms disclosed herein (e.g., on-demand training and deployment of color space convolutional neural networks may be provided via one or more cloud computing system utilizing a combination of characteristics, service models, and deployment models as suits the particular implementation.

Figure 8:
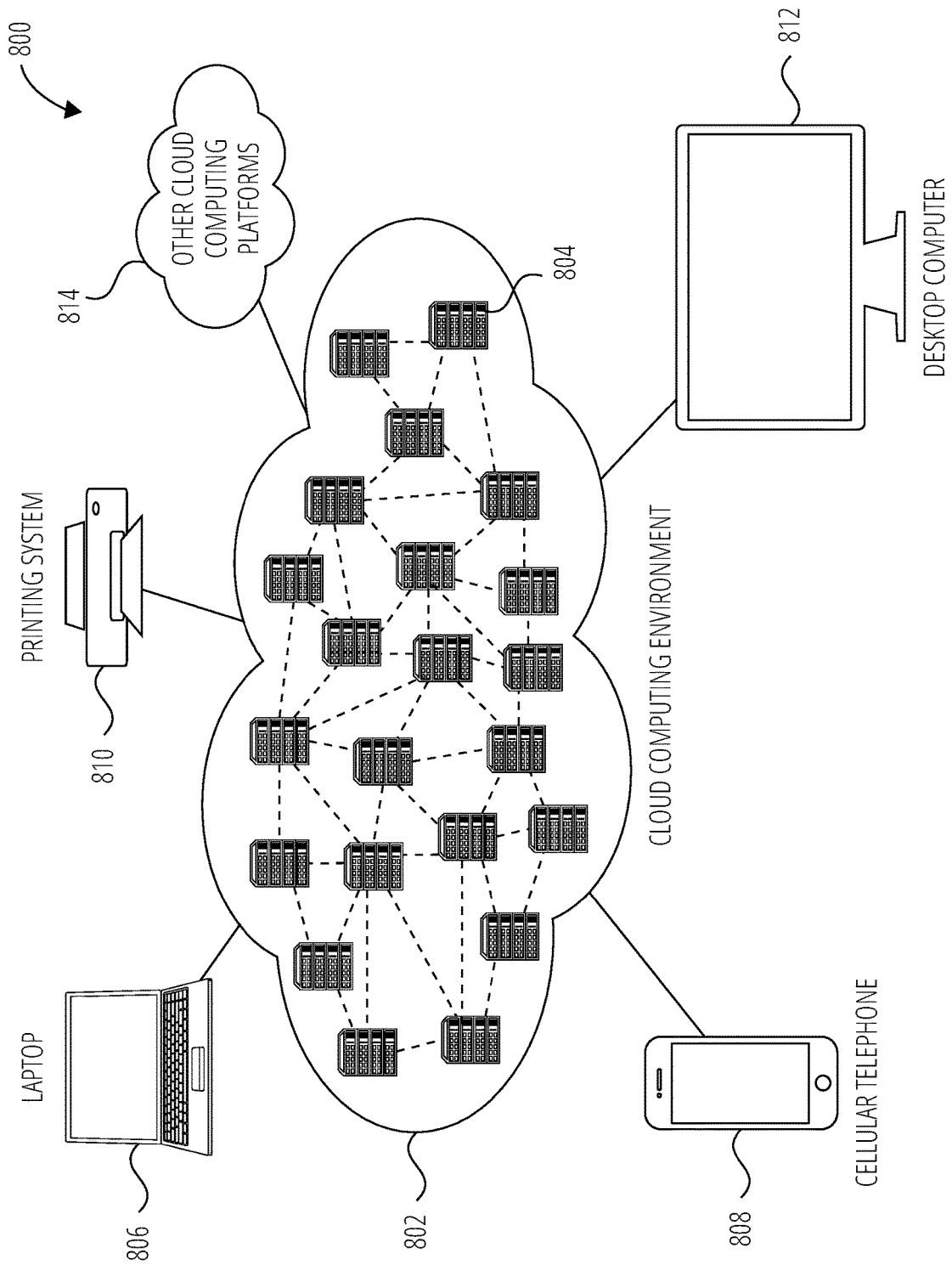
FIG. 8 depicts a cloud computing system 800 that may implement aspects of the disclosed embodiments.

Referring now to FIG. 8, an illustrative cloud computing environment 802 is depicted in a cloud computing system 800. "Cloud computing" herein refers to a system providing on-demand network access to a shared pool of configurable computing resources (e.g., networks, servers, storage, applications, and services). Examples of commercially hosted Cloud computing systems 800 include Amazon Web Services (AWS), Google Cloud, Microsoft Azure, etc.

The cloud computing environment 802 comprises one or more computing nodes 804 with which computing devices such as, for example, laptops 806, personal digital assistants (PDAs) or cellular telephones 808, printing systems 810, desktop computers 812, and other cloud computing platforms 814, may communicate.

This enables infrastructure and platform use, and/or software, to be provided as services, so as to not call for each client to separately maintain such resources. It is understood that the types of computing devices shown in FIG. 8 are intended to be illustrative and that more generally the cloud computing environment 802 may communicate with any type of computerized device over any type of network and/or network/addressable connection (e.g., using a web browser).

A cloud computing system may comprise characteristics, service models, and at deployment models. For example, characteristics of cloud computing systems may include:

1. "On-demand self-service", by which a consumer may unilaterally provision computing capabilities, such as server time and network storage, as needed, automatically without human interaction with each service's provider.
2. "Broad network access" capabilities over a network and accessed through standard mechanisms that promote use by heterogeneous thin or thick client platforms (e.g., mobile phones, laptops, and PDAs).
3. "Resource pooling", by which computing resources are pooled to serve multiple consumers using a multi-tenant model, with different physical and virtual resources dynamically assigned and reassigned according to consumer demand. Location independence may be provided in that the customer generally does not control the exact location of the provided resources but may be able to specify location at a higher level of abstraction (e.g., country, state, or datacenter). Examples of resources include storage, processing, memory, network bandwidth, and virtual machines.
4. "Rapid elasticity" by which resources may be rapidly and elastically provisioned, in some cases automatically, to scale up or down. To the consumer, the capabilities available for provisioning may appear to be essentially unlimited.
5. "Measured service", by which a cloud system automatically controls and optimize resource use by applying metering mechanisms at a level of abstraction appropriate to the type of service (e.g., storage, processing, bandwidth, and active user accounts). Resource usage may be monitored, controlled, and reported providing transparency for both the provider and consumer of the utilized service.

Service models that may be implemented by cloud computing systems include:

1. "Cloud Software as a Service (SaaS)" by which software applications are provided through a thin client interface such as a web browser (e.g., web-based email). The consumer does not manage or control the underlying cloud infrastructure including network, servers, operating systems, storage, or even individual application capabilities, with the possible exception of limited user-specific application configuration settings.
2. "Cloud Platform as a Service (PaaS)" by which consumers deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.
3. "Cloud Infrastructure as a Service (IaaS)" providing the consumer with the capability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models by which the capabilities of cloud computing systems may be provided include:

1. "Private cloud" whereby the cloud infrastructure is operated solely for an organization. It may be managed by the organization or a third party and may exist on-premises or off-premises.
2. "Community Cloud" whereby the cloud infrastructure is shared by several organizations and supports a specific community that has shared concerns (e.g., mission, security requirements, policy, and compliance considerations). It may be managed by the organizations or a third party and may exist on-premises or off-premises.
3. "Public Cloud" whereby the cloud infrastructure is made available to the general public or a large industry group and is owned by an organization selling cloud services.
4. "Hybrid Cloud" whereby the cloud infrastructure is a composition of two or more clouds (private, community, or public) that remain unique entities but are bound together by standardized or proprietary technology that enables data and application portability (e.g., cloud bursting for load-balancing between Clouds).

A node of the cloud computing system may comprise one or more systems comprising similar components as those described and depicted in FIG. 7.

LISTING OF DRAWING ELEMENTS

102 colorized digital document
104 machine display device
106 source pixel
108 destination pixel
110 neural network training system
202 convolutional neural network
204 printer
206 document origination system
208 color digital document 210 neural network training system
212 main memory
214 pixel-to-paper printing logic
216 printed page
218 memory management logic
220 layer instance
222 cache memory
224 pixel
226 pixel
400 convolution layer
402 next layer
404 filter
502 input pixels
504 output pixels
506
508
600 block
602 block
604 block
606 block
608 block
700 pixel rendering device
702 monitor or graphical user interface
704 data processing system
706 communication network interface
708 input device(s)
710 output device(s)
712 processor(s)
714 bus subsystem
716 volatile memory
718 nonvolatile memory
720 logic
722 communication network
800 cloud computing system
802 cloud computing environment
804 computing nodes
806 laptop
808 cellular telephone
810 printing system
812 desktop computer
814 other cloud computing platforms Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Logic symbols in the drawings should be understood to have their ordinary interpretation in the art in terms of functionality and various structures that may be utilized for their implementation, unless otherwise indicated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A device comprising:
    a main memory;
    a cache memory;
    a convolutional neural network configured to convert a plurality of pixels from a first color space to a second color space, the convolutional neural network organized into execution-separable layers; and
    logic to load a first layer of the convolutional neural network from the main memory to the cache memory, process the pixels through the first layer, evict the first layer from the cache memory, load a second layer of the convolutional neural network from the main memory to the cache memory, and process the pixels through the second layer;
    wherein the convolutional neural network comprises exactly six convolutional layers; and
    wherein each of the six convolutional layers comprises a filter size of one.

2. The device of claim 1, wherein each of the convolutional layers comprises a stride size of one.

3. The device of claim 1, wherein the first color space and the second color space are both three-dimensional color spaces or both four-dimensional color spaces.

4. The device of claim 1, wherein one of the color spaces is a three-dimensional color space and the other color space is a four-dimensional color space.

5. The device of claim 1, wherein the device is a color printer.

6. A device comprising:
    a main memory;
    a cache memory;
    a convolutional neural network configured to convert a plurality of pixels from a first color space to a second color space, the convolutional neural network organized into execution-separable layers; and
    logic to load a first layer of the convolutional neural network from the main memory to the cache memory, process the pixels through the first layer, evict the first layer from the cache memory, load a second layer of the convolutional neural network from the main memory to the cache memory, and process the pixels through the second layer;
    wherein the convolutional neural network comprises exactly six convolutional layers; and
    wherein the six convolutional layers are configured as 3→32→64→128→128→64→4 or 3→64→128→256→128→64→4.

7. A system comprising:
    a device comprising:
        a main memory;
        a cache memory; and
        logic to detect a profile for a first color space embedded in a digital document and to submit the profile to a neural network training system in response to receiving a print job comprising the digital document;
    a server system comprising:
        logic to apply the profile as a training set to configure a convolutional neural network to convert a plurality of pixels from the first color space to a second color space utilized by the device, the convolutional neural network organized into execution-separable layers; and
        the device further comprising logic to load a first layer of the convolutional neural network from the main memory to the cache memory, process pixels of the digital document through the first layer, evict the first layer from the cache memory, load a second layer of the convolutional neural network from the main memory to the cache memory, and process the pixels through the second layer;
    wherein the convolutional neural network comprises exactly six convolutional layers; and
    wherein each of the six convolutional layers comprises a filter size of one.

8. The device of claim 7, wherein the convolutional neural network is a pretrained convolutional neural network.

9. The device of claim 7, wherein each of the six convolutional layers comprises a stride size of one.

10. The device of claim 7, wherein the first color space and the second color space are both three-dimensional color spaces or four-dimensional color spaces.

11. The device of claim 7, wherein one of the color spaces is a three-dimensional color space and the other color space is a four-dimensional color space.

12. The device of claim 7, wherein the device is a color printer.

13. The device of claim 7, wherein the server system is a cloud computing system.

14. A method of converting a plurality of pixels from a first color space to a second color space via a convolutional neural network,
    wherein the convolutional neural network is organized into execution-separable layers,
    wherein the convolutional neural network comprises exactly six convolutional layers, and wherein each of the six convolutional layers comprises a filter size of one, the method comprising:

loading a first layer of the convolutional neural network from a main memory of a device to a cache memory of the device;

processing the pixels through the first layer in the cache memory;

evicting the first layer from the cache memory;

loading a second layer of the convolutional neural network from the main memory to the cache memory; and processing the pixels through the second layer.

* * * * *